US012784391B2

(12) United States Patent
Anand et al.

(10) Patent No.: US 12,784,391 B2
(45) Date of Patent: Nov. 3, 2026

(54) SYSTEM AND METHOD FOR ONE-SHOT ANATOMY LOCALIZATION WITH UNSUPERVISED VISION TRANSFORMERS FOR THREE-DIMENSIONAL (3D) MEDICAL IMAGES

(71) Applicant: GE Precision Healthcare LLC, Waukesha, WI (US)

(72) Inventors: Deepa Anand, Bangalore (IN); Dattesh Dayanand Shanbhag, Bangalore (IN); Chitresh Bhushan, Schenectady, NY (US); Dawei Gui, Sussex, WI (US); Kavitha Manickam, Pewaukee, WI (US); Maggie MeiKei Fung, Jersey City, NJ (US); Gurunath Reddy Madhumani, Bangalore (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 376 days.

(21) Appl. No.: 18/475,406

(22) Filed: Sep. 27, 2023

(65) Prior Publication Data

US 2025/0104270 A1 Mar. 27, 2025

(51) Int. Cl.

| | |
|---|---|
| ***G06V 10/25*** | (2022.01) |
| ***G06T 7/00*** | (2017.01) |
| ***G06T 7/73*** | (2017.01) |
| ***G06V 10/26*** | (2022.01) |
| ***G06V 10/44*** | (2022.01) |

(Continued)

(52) U.S. Cl.

CPC ............ *G06V 10/25* (2022.01); *G06T 7/0014* (2013.01); *G06T 7/73* (2017.01); *G06T 7/74* (2017.01);

(Continued)

(58) Field of Classification Search

CPC ......... G06T 7/0014; G06T 7/344; G06T 7/73; G06T 7/74; G06T 2200/04;

(Continued)

(56) References Cited

U.S. PATENT DOCUMENTS

| | | | |
|---|---|---|---|
| 8,385,688 | B2 | 2/2013 | Gong et al. |
| 10,929,708 | B2 | 2/2021 | Syeda-Mahmood et al. |

(Continued)

OTHER PUBLICATIONS

Yan et al. "SAM: Self-supervised Learning of Pixel-wise Anatomical Embeddings in Radiological Images" arXiv.org, version 2, publ. Apr. 21, 2022, accessed Oct. 28, 2025 via <https://arxiv.org/abs/2012.02383v2> (Year: 2022).*

(Continued)

*Primary Examiner* — John Villecco
*Assistant Examiner* — Joshua B. Crockett
(74) *Attorney, Agent, or Firm* — Fletcher Yoder, P.C.

(57) ABSTRACT

A method for performing one-shot anatomy localization includes obtaining a medical image of a subject. The method includes receiving a selection of both a template image and a region of interest within the template image, wherein the template image includes one or more anatomical landmarks assigned a respective anatomical label. The method includes inputting both the medical image and the template image into a trained vision transformer model. The method includes outputting from the trained vision transformer model both patch level features and image level features for both the medical image and the template image. The method still further includes interpolating pixel level features from the patch level features for both the medical image and the template image. The method includes utilizing the pixel level features within the region of interest of the template image to locate and label corresponding pixel level features in the medical image.

14 Claims, 12 Drawing Sheets

(51) Int. Cl.

| | |
|---|---|
| ***G06V 10/762*** | (2022.01) |
| ***G06V 10/774*** | (2022.01) |
| ***G06V 20/70*** | (2022.01) |
| *G06T 7/33* | (2017.01) |

(52) U.S. Cl.

CPC .............. *G06V 10/26* (2022.01); *G06V 10/44* (2022.01); *G06V 10/762* (2022.01); *G06V 10/7753* (2022.01); *G06V 20/70* (2022.01); *G06T 7/344* (2017.01); *G06T 2200/04* (2013.01); *G06T 2207/10088* (2013.01); *G06T 2207/20081* (2013.01); *G06T 2207/30004* (2013.01); *G06V 2201/03* (2022.01); *G06V 2201/031* (2022.01)

(58) Field of Classification Search

CPC . G06T 2207/10081; G06T 2207/10088; G06T 2207/20081; G06T 2207/20084; G06T 2207/30004; G06V 10/25; G06V 10/26; G06V 10/44; G06V 10/762; G06V 10/7753; G06V 20/70; G06V 2201/03; G06V 2201/031

See application file for complete search history.

(56) References Cited

U.S. PATENT DOCUMENTS

| | | | | |
|---|---|---|---|---|
| 11,049,243 | B2 | 6/2021 | Odry et al. | |
| 11,232,319 | B2 | 1/2022 | Udupa et al. | |
| 11,615,879 | B2 | 3/2023 | Do et al. | |
| 2014/0029857 | A1* | 1/2014 | Kompalli | G06V 10/757 382/212 |
| 2018/0089530 | A1* | 3/2018 | Liu | G06V 10/764 |
| 2021/0265043 | A1 | 8/2021 | Haghighi et al. | |
| 2022/0176157 | A1* | 6/2022 | Novosad | A61N 5/1039 |
| 2026/0017921 | A1* | 1/2026 | Salehi | G06V 10/762 |

OTHER PUBLICATIONS

Amir et al. “Deep ViT Features as Dense Visual Descriptors” arXiv.org, publ. Oct. 15, 2022, accessed Oct. 28, 2025 via <https://arxiv.org/abs/2112.05814> (Year: 2022).*

Chen et al. “Unsupervised Local Discrimination for Medical Images”, arXiv.org, publ. Aug. 17, 2022, accessed on Jun. 24, 2026 via <https://arxiv.org/pdf/2108.09440> (Year: 2022).*

Donner et al., “Fast Anatomical Structure Localization Using Top-Down Image Patch Regression,” Oct. 2012, MICCAI Workshop om Medical Computer Vision, Nice, France, 10 pgs.

Donner et al., “Global localization of 3D anatomical structures by pre-filtered Hough Forests and discrete optimization,” 2013, Medical Image Analysis 17, 11 pgs, Elsevier.

Wang et al., “One-shot Learning Landmarks Detection,” Oct. 11, 2021, MICCAI Workshop on Data Augmentation, Labeling, and Imperfections, Strasbourg, France, 10 pgs.

Donner et al., “One-Shot Learning of Anatomical Structure Localization Models”, IEEE 10th International Symposium on Biomedical Imaging, 2013, 4 pgs.

* cited by examiner

SYSTEM AND METHOD FOR ONE-SHOT ANATOMY LOCALIZATION WITH UNSUPERVISED VISION TRANSFORMERS FOR THREE-DIMENSIONAL (3D) MEDICAL IMAGES

BACKGROUND

The subject matter disclosed herein relates to medical imaging and, more particularly, to a system and a method for one-shot anatomy localization with unsupervised vision transformers for three-dimensional (3D) medical images.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During MRI, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

For many medical imaging applications (including MRI), anatomical and landmark localization is an important preprocessing step towards final application. For example, this is important with an intelligent prescription module (such as AIR$_x$™ from General Electric Healthcare) in MRI, automated image alignment in computed tomography (CT) imaging, or driving image registration with image contours. Typically, this process is currently either done manually or via fine-tuning through various segmentation algorithms such as level sets or anatomy-based point landmark detectors. Each of these is specific to the anatomy of interest and must be done repeatedly based on change in anatomy or imaging data. This also includes generating the ground truth for supervised segmentation (e.g., as done with AIR$_x$™).

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for performing one-shot anatomy localization is provided. The computer-implemented method includes obtaining, at a processor, a medical image of a subject. The computer-implemented method also includes receiving, at the processor, a selection of both a template image and a region of interest within the template image, wherein the template image includes one or more anatomical landmarks assigned a respective anatomical label. The computer-implemented method further includes inputting, via the processor, both the medical image and the template image into a trained vision transformer model. The computer-implemented method even further includes outputting, via the processor, from the trained vision transformer model both patch level features and image level features for both the medical image and the template image. The computer-implemented method still further includes interpolating, via the processor, pixel level features from the patch level features for both the medical image and the template image. The computer-implemented method yet further includes utilizing, via the processor, the pixel level features within the region of interest of the template image to locate and label corresponding pixel level features in the medical image.

In another embodiment, a computer-implemented method for performing one-shot anatomy localization is provided. The computer-implemented method includes obtaining, at a processor, a medical image of a subject. The computer-implemented method also includes receiving, at the processor, a selection of a template image, wherein the template image includes one or more anatomical landmarks assigned a respective anatomical label, and a first reference point is marked on the template image. The computer-implemented method further includes inputting, via the processor, both the medical image and the template image into a trained vision transformer model. The computer-implemented method even further includes outputting, via the processor, from the trained vision transformer model both patch level features and image level features for both the medical image and the template image. The computer-implemented method still further includes interpolating, via the processor, pixel level features from the patch level features for both the medical image and the template image. The computer-implemented method yet further includes clustering, via the processor, the pixel level features for both the medical image and the template image into anatomically similar regions. The computer-implemented method further includes assigning, via the processor, cluster labels to pixels of both the medical image and the template image for corresponding anatomically similar regions.

In another embodiment, a system for performing one-shot anatomy localization is provided. The system includes a memory encoding processor-executable routines. The system also includes a processor configured to access the memory and to execute the processor-executable routines, wherein the routines, when executed by the processor, cause the processor to perform actions. The actions include obtaining a medical image of a subject. The actions also include receiving a selection of a template image, wherein the template image includes one or anatomical landmarks assigned a respective anatomical label, and a first reference point is marked on the template image. The actions further include inputting both the medical image and the template image into a trained vision transformer model. The actions even further include outputting from the trained vision transformer model both patch level features and image level features for both the medical image and the template image. The actions still further include interpolating pixel level features from the patch level features for both the medical image and the template image. The actions yet further include clustering the pixel level features for both the medical image and the template image into anatomically similar regions. The actions further include assigning cluster labels to pixels of both the medical image and the template image for corresponding anatomically similar regions.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
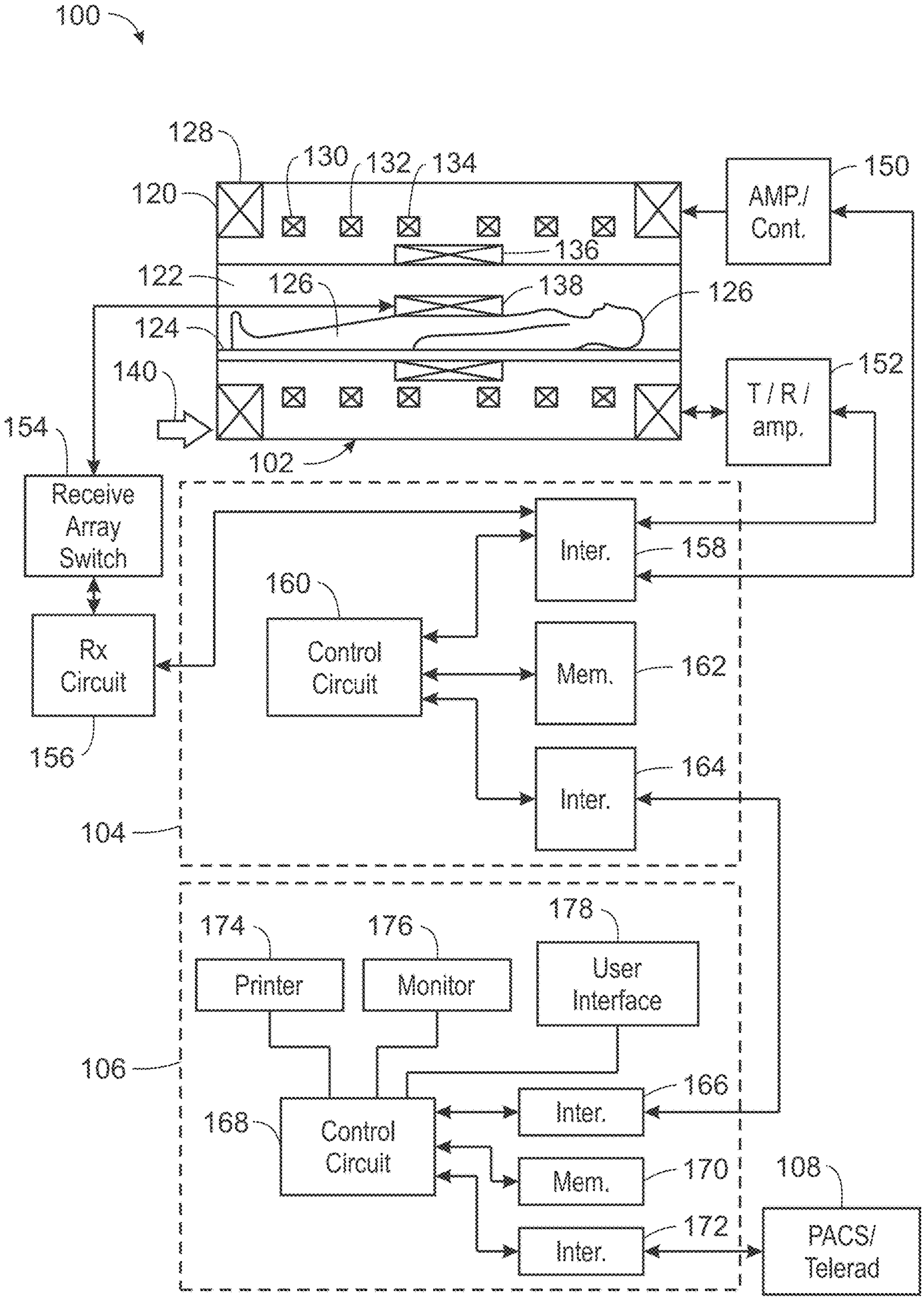
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Deep-learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, wavelet filter banks, u-nets, general adversarial networks (GANs), dense neural networks, or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

One type of deep learning model is a vision transformer model. A vision transformer model utilizes transformers (e.g., vision transformers) for image recognition tasks. In particular, a vision transformer model breaks down an input image (e.g., medical image) into patches, processes these patches using transformers, and aggregates the information for classification or object detection. A vision transformer model utilizes self-attention (i.e., a global operation) since it draws information from the whole image. This enables the vision transformer model to capture distinct semantic relevancies in an image effectively. Vision transformer models obtain similar or better results than other types of deep learning models (e.g., convolutional networks) while requiring substantially fewer computational resources to train.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

The present disclosure provides systems and methods for performing one-shot (e.g., single pass) anatomy localization. In particular, the one-shot anatomy localization is done in conjunction with unsupervised vision transformers for medical images (e.g., three-dimensional (3D) medical images). The disclosed techniques may be utilized with different types of medical images. For example, the images may be obtained from MRI, computed tomography (CT) imaging, or other types of imaging systems. In the present disclosure, the techniques are described in the context of MRI.

The approach described herein combines unsupervised training (i.e., without ground truths) of a large of medical imaging data coupled with one-shot or single pass labeling of the data using a template pixel or region. This enables automatic labeling of a large amount of data without any supervision. The labeling enables anatomical localization utilizing labeling of specific regions or textures based on the template pixel is used. In certain embodiments, labeling may be utilized for other applications (e.g., lesion detection if the lesion can be found in a template image).

The vision transformer model is trained on an unlabeled pool of data using vision transformers as the backbone with the objective of deriving representations of images to push them closer for similar images and to push apart features of dissimilar images. The transformer architecture enables deriving patch level features which can be extended into pixel level features (e.g., interpolation). After the completion of the model training, the techniques described herein allows choosing template images and regions of interest within an anatomy of interest. With the template region (e.g., template image) and pixel level features obtained from unsupervised training, different approaches for anatomical labeling may be utilized. The same trained model can be used for all body parts.

In certain embodiments, anatomical labeling is based on a prominent region of interest being present (e.g., in the template image). This approach involves directly querying features corresponding to the region of interest in a template image in a target image (e.g., target medical image). This approach is preferred when the landmark is well distinct such a bone (e.g., a bright bulky or prominent region within a dark rim).

In certain embodiments (e.g., when the anatomy is distinct in an image (e.g., template image)), the disclosed systems and methods (e.g., for performing one-shot or single pass anatomy localization) include obtaining, at a processor, a medical image of a subject. The disclosed systems and methods also include receiving, at the processor, a selection of a template image, wherein the template image includes one or anatomical landmarks assigned a respective anatomical label, and the first reference point is marked on the template image. The disclosed systems and methods further include inputting, via the processor, both the medical image and the template image into a trained vision transformer model. The disclosed systems and methods even further include outputting, via the processor, from the trained vision transformer model both patch level features and image level features for both the medical image and the template image. The disclosed systems and methods still further include interpolating, via the processor, pixel level features from the patch level features for both the medical image and the template image. The disclosed systems and methods yet further include clustering, via the processor, the pixel level features for both the medical image and the template image into anatomically similar regions. The disclosed systems and methods further include assigning, via the processor, cluster labels to pixels of both the medical image and the template image for corresponding anatomically similar regions. In certain embodiments, the disclosed systems and methods include assigning, via the processor, the corresponding pixel level features in the medical image an anatomical label corresponding to the region of interest in the template image. In certain embodiments, the disclosed systems and methods include marking, via the processor, the region of interest in the template image with a first reference point. In certain embodiments, the disclosed systems and methods include marking, via the processor, a corresponding region of interest in the medical image with a second reference point that corresponds to the region of interest in the template image with the first reference point.

In certain embodiments, the disclosed systems and methods include obtaining, at the processor, an orthogonal set of medical images of the subject, wherein the orthogonal set of medical images describe a three-dimensional volume of a region of interest of the subject. The disclosed systems and methods also include receiving, at the processor, a selection of both a corresponding template image and respective region of interest within the corresponding template image to utilize with each respective medical image of the orthogonal set of images, wherein each corresponding template image includes one or more anatomical landmarks assigned respective anatomical labels. The disclosed systems and methods further include inputting, via the processor, both the orthogonal set of medical images and the corresponding template images into the trained vision transformer model. The disclosed systems and methods still further include outputting, via the processor, from the trained vision transformer model both respective patch level features and respective image level features for both the orthogonal set of medical images and the corresponding template images. The disclosed systems and methods yet further include interpolating, via the processor, respective pixel level features from the respective patch level features for both the orthogonal set of medical images and the corresponding template images. The disclosed systems and methods further include utilizing, via the processor, the respective pixel level features within the respective region of interest of each corresponding template image to locate and label corresponding pixel level features in each corresponding respective medical image of the orthogonal set of images.

In certain embodiments, anatomical labeling is cluster based. For anatomy which is not distinctly separated in an image (e.g., template image), this approach utilizes pixel clustering based on pixel level features. The number of clusters is visually fine-tuned as needed for separation of image sections for the desired granularity on the template images. Further, the coordinates of the landmark is marked on the template images. For any target image, a paired clustering of pixel features of target image and template image is performed in order to get corresponding regions in both. The region corresponding to the landmark point (e.g., reference point) in the template image is transferred to the target image using region correspondences. This effectively identifies the region of interest.

In certain embodiments (e.g., when the anatomy is not distinct in an image), the disclosed systems and methods (e.g., for performing one-shot anatomy localization) include obtaining, at a processor, a medical image of a subject. The disclosed systems and methods also include receiving, at the processor, a selection of a template image, wherein the template image includes one or anatomical landmarks assigned a respective anatomical label, and the first reference point is marked on the template image. The disclosed systems and methods further include inputting, via the processor, both the medical image and the template image into a trained vision transformer model. The disclosed systems and methods even further include outputting, via the processor, from the trained vision transformer model both patch level features and image level features for both the medical image and the template image. The disclosed systems and methods still further include interpolating, via the processor, pixel level features from the patch level features for both the medical image and the template image. The disclosed systems and methods yet further include clustering, via the processor, the pixel level features for both the medical image and the template image into anatomically similar regions. The disclosed systems and methods further include assigning, via the processor, cluster labels to pixels of both the medical image and the template image for corresponding anatomically similar regions. In certain embodiments, assigning cluster labels includes applying segmentation masks to the both the medical image and the template image. In certain embodiments, the disclosed systems and methods include assigning, via the processor, one or more of the corresponding anatomically similar regions in the medical image with the respective anatomical label associated with the corresponding anatomically similar regions in the template image. In certain embodiments, the disclosed systems and methods include marking, via the processor, a region of interest in the template image with a first reference point. In certain embodiments, the disclosed systems and methods include marking, via the processor, a corresponding region in the medical image with a second reference point that corresponds to the region of interest in the template image marked with the first reference point.

In certain embodiments, the disclosed systems and methods include obtaining, at the processor, an orthogonal set of medical images of the subject, wherein the orthogonal set of medical images describe a three-dimensional volume of a region of interest of the subject. The disclosed systems and methods include receiving, at the processor, a selection of a set of template images, wherein each template image of the set of template images includes one or anatomical landmarks assigned respective anatomical labels, and a respective reference point is marked on each template image of the set of template images, wherein each template image of the set of template images corresponds to a respective medical image of the set of medical images. The disclosed systems and methods further include inputting, via the processor, both the orthogonal set of medical images and the set of template images into the trained vision transformer model. The disclosed systems and methods yet further include outputting, via the processor, from the trained vision transformer model both respective patch level features and respective image level features for both the orthogonal set of medical images and the set of template images. The disclosed systems and methods yet further include interpolating, via the processor, respective pixel level features from the respective patch level features for both the orthogonal set of medical images and the set of template images. The disclosed systems and methods even further include clustering, via the processor, the respective pixel level features for both the orthogonal set of medical images and the set of template images into anatomically similar regions. The disclosed systems and methods further include assigning, via the processor, cluster labels to the pixels of both the orthogonal set of medical images and the set of template images for corresponding anatomically similar regions.

Utilizing clustering of pixel level features allows for customizable granularity of region segmentation. The setup for the number of clusters and/or template pixel region of interest only needs to be done once for performing the one or more tasks at hand and then the setup is used automatically to label a large pool of data (e.g., in a target medical image).

The disclosed embodiments eliminate the need for manual annotation. The disclosed embodiments provide a fast, automatic localization of an anatomical landmark (e.g., for a subsequent imaging scan). The disclosed embodiments utilizes transformers to identify corresponding landmark points between pairs of images without supervision, image registration, or any standardized shape or size. The disclosed embodiments also save time in planning a scan by avoiding repeated localizer scans.

With the preceding in mind, FIG. 1 a magnetic resonance imaging (MRI) system 100 is illustrated schematically as including a scanner 102, scanner control circuitry 104, and system control circuitry 106. According to the embodiments described herein, the MRI system 100 is generally configured to perform MR imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the MRI system 100 may include any suitable scanner or detector, in the illustrated embodiment, the system 100 includes a full body scanner 102 having a housing 120 through which a bore 122 is formed. A table 124 is moveable into the bore 122 to permit a patient 126 (e.g., subject) to be positioned therein for imaging selected anatomy within the patient.

Scanner 102 includes a series of associated coils for producing controlled magnetic fields for exciting the gyromagnetic material within the anatomy of the patient being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., RF transmit coil) is configured to generate radio frequency pulses for exciting the certain gyromagnetic nuclei within the patient. In addition to the coils that may be local to the scanner 102, the system 100 also includes a set of receiving coils or RF receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, $B_0$. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the MRI system 100 and to store the processed image data for later reconstruction, display and transmission. The programming code may execute one or more algorithms that, when executed by a processor, are configured to perform reconstruction of acquired data as described below. In certain embodiments, the memory circuit 170 may store vision transformer models for the techniques described below. In certain embodiments, image reconstruction may occur on a separate computing device having processing circuitry and memory circuitry.

The programming code (e.g., of the MRI system or another type of imaging system or a remote computing device) may enable one-shot anatomy localization with unsupervised vision transformers. In certain embodiments, the programming code may enable (e.g., when the anatomy is distinct in an image (e.g., template image)), obtaining a medical image of a subject. The programming code may enable receiving a selection of a template image, wherein the template image includes one or anatomical landmarks assigned a respective anatomical label, and the first reference point is marked on the template image. The programming code may enable inputting both the medical image and the template image into a trained vision transformer model. The programming code may enable outputting from the trained vision transformer model both patch level features and image level features for both the medical image and the template image. The programming code may enable interpolating pixel level features from the patch level features for both the medical image and the template image. The programming code may enable clustering the pixel level features for both the medical image and the template image into anatomically similar regions. The programming code may enable assigning cluster labels to pixels of both the medical image and the template image for corresponding anatomically similar regions. In certain embodiments, the programming code may enable assigning the corresponding pixel level features in the medical image an anatomical label corresponding to the region of interest in the template image. In certain embodiments, the programming code may enable marking the region of interest in the template image with a first reference point. In certain embodiments, the programming code may enable marking a corresponding region of interest in the medical image with a second reference point that corresponds to the region of interest in the template image with the first reference point.

In certain embodiments, the programming code may enable (e.g., when the anatomy is not distinct in an image) obtaining a medical image of a subject. The programming code may enable receiving a selection of a template image, wherein the template image includes one or anatomical landmarks assigned a respective anatomical label, and the first reference point is marked on the template image. The programming code may enable inputting both the medical image and the template image into a trained vision transformer model. The programming code may enable outputting from the trained vision transformer model both patch level features and image level features for both the medical image and the template image. The programming code may enable interpolating pixel level features from the patch level features for both the medical image and the template image. The programming code may enable clustering the pixel level features for both the medical image and the template image into anatomically similar regions. The programming code may enable assigning cluster labels to pixels of both the medical image and the template image for corresponding anatomically similar regions. In certain embodiments, assigning cluster labels includes applying segmentation masks to the both the medical image and the template image. In certain embodiments, the programming code may enable assigning one or more of the corresponding anatomically similar regions in the medical image with the respective anatomical label associated with the corresponding anatomically similar regions in the template image. In certain embodiments, the programming code may enable marking a region of interest in the template image with a first reference point. In certain embodiments, the programming code may enable marking a corresponding region in the medical image with a second reference point that corresponds to the region of interest in the template image marked with the first reference point.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
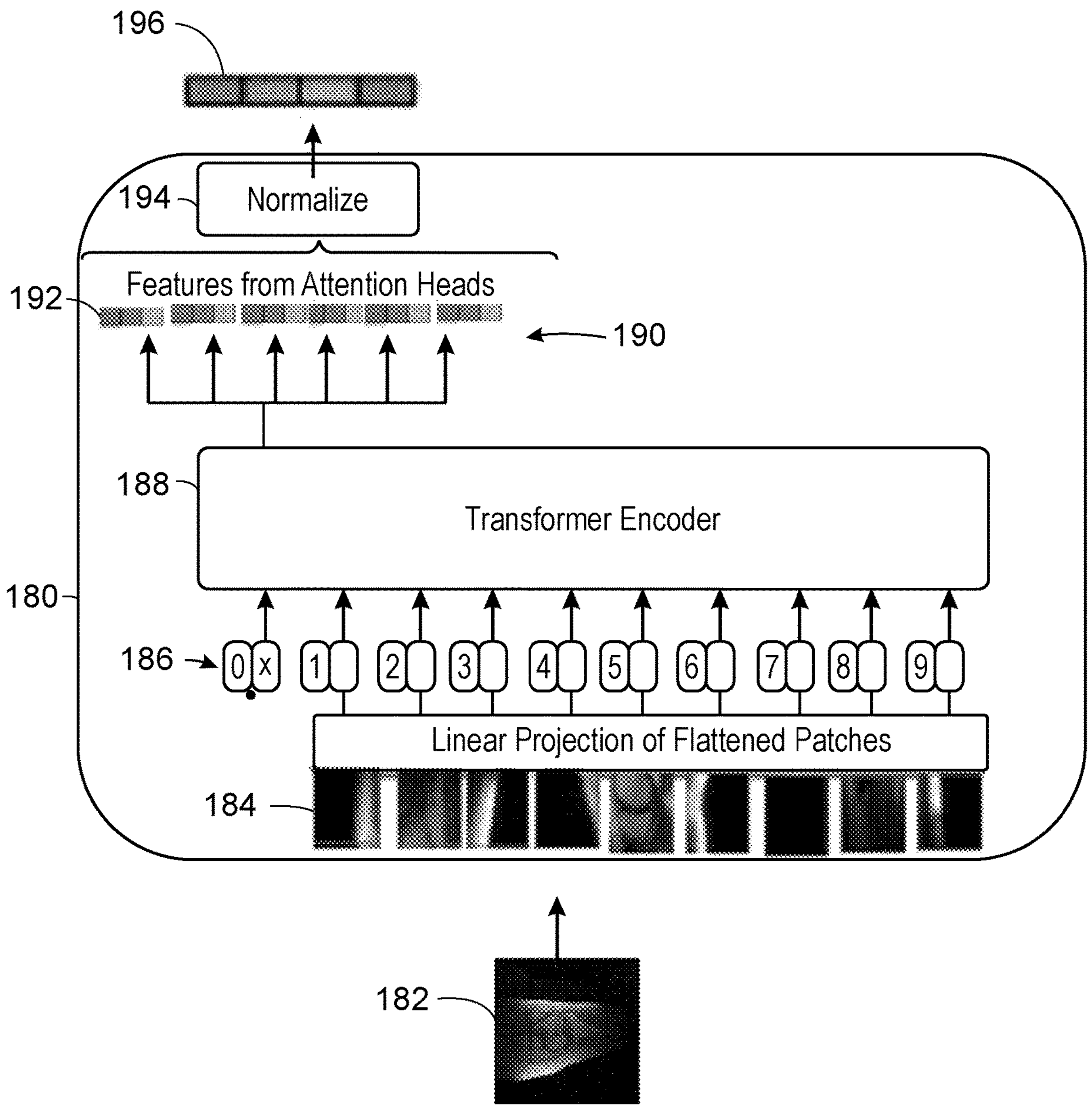
FIG. 2 illustrates a schematic diagram of a vision transformer model, in accordance with aspects of the present disclosure.

FIG. 2 illustrates a schematic diagram of a vision transformer model 180. As depicted, a medical image 182 is inputted into the vision transformer model. The medical image 182 is split into a sequence of fixed-size non-overlapping patches 184. The patches 184 are flattened and then linearly embedded (i.e., arranged in a linear sequence and multiplied by the embedding matrix). Also, absolute position embedding is added. A [CLS] token is also added to serve as a representation of the entire image, which can be used for classification. The patch and positioning embedding results in vectors 186 (e.g., learnable vectors) that are fed into a transformer encoder 188. The transformation encoder 188 may include a number of blocks. Each block may include a normalization layer, a multi-head attention network, and multi-layer perceptrons. The normalization layer enables the vision transformer model 180 to adapt to variations in the patches 184 (e.g., sequence tokens). The multi-head attention network generates attention maps (e.g., attention heads) from the given embedded visual tokens. The multi-layer perceptrons is a two-layer classification network with Gaussian error linear unit (GELU) at the end. A final multi-layer perceptrons block (e.g., MLP head 190) may be output from the transformer encoder 188. The MLP head 190 includes features 192 (e.g., image features and patch features) from attention heads. The features 192 are normalized as indicated by reference numeral 194 to generate a vector as indicated by reference numeral 196.

Figure 3:
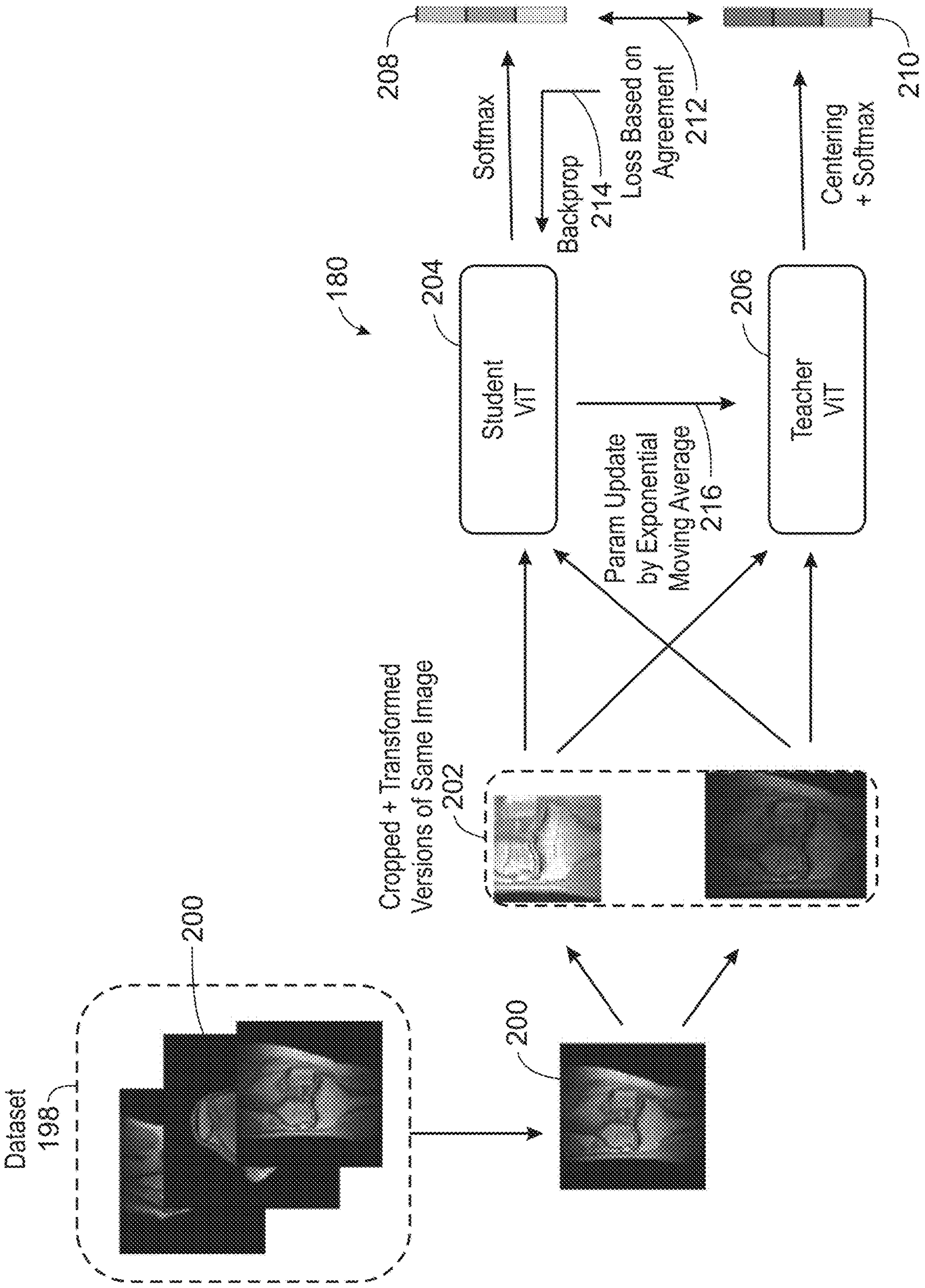
FIG. 3 illustrates a schematic diagram of self-supervised training of a vision transformer model, in accordance with aspects of the present disclosure.

FIG. 3 illustrates a schematic diagram of self-supervised training of the vision transformer model 180. As depicted in FIG. 3, a large dataset 198 of unlabeled medical imaging data (e.g., a plurality of unlabeled medical images 200) are obtained. In certain embodiments, the plurality of medical images are MR images. In certain embodiments, the plurality of medical images may be derived from other types of imaging (e.g., CT imaging). Each image 200 from the large dataset 198 is subject to cropping and transformation to generate cropped and transformed versions of each image as indicated by reference numeral 202. The cropped and transformed images 202 are input into the vision transformer model 180. In particular, cropped and transformed images 202 are input into both a student vision transformer 204 (e.g. Student ViT) and a teacher vision transformer 206 (e.g., Teacher ViT). Both the student vision transformer 204 and the teacher vision transformer 206 have the same architecture but different parameters. Both the student vision transformer 204 and the teacher vision transformer 206 output respective K-dimensional features or vectors (e.g., patch features and image features) represented by reference numeral 208 and 210. The output (e.g., K-dimensional feature 210) of the teacher vision transformer 206 is centered with a mean computed over the batch. The outputs (e.g., K-dimensional features 208 and 210) of both the student vision transformer 204 and the teacher vision transformer 206 are each normalized with a temperature softmax over the feature dimension. The similarity of the K-dimensional features 208 and 210 are the measured with a cross-entry loss as indicated by arrow 212. The gradients are backpropagated (e.g., by applying a stop-gradient operator on the teacher vision transformer 206) only through the student vision transformer 204 as indicated by arrow 214. The parameters of the teacher vision transformer 206 are updated with an exponential moving average of the parameters of the student vision transformer 204 as indicated by arrow 216. The teacher vision transformer 206 acts as a form of model ensembling to improve the performance of the model 180. The teacher vision transformer 206 has better performance than the student vision transformer 204 throughout the training and, thus, guides the training of the student vision transformer 204 by providing target features of higher quality.

The model 180 enables unsupervised learning of image features. The backbone of the model 180 are the vision transformers (e.g., student vision transformer 204 and the teacher vision transformer 206). The vision transformer backbone enables the learning of patch level features (e.g., based on token size) by the model 180. Post-processing (e.g., interpolation) enables pixel level feature extraction from the patch level features.

Figure 4:
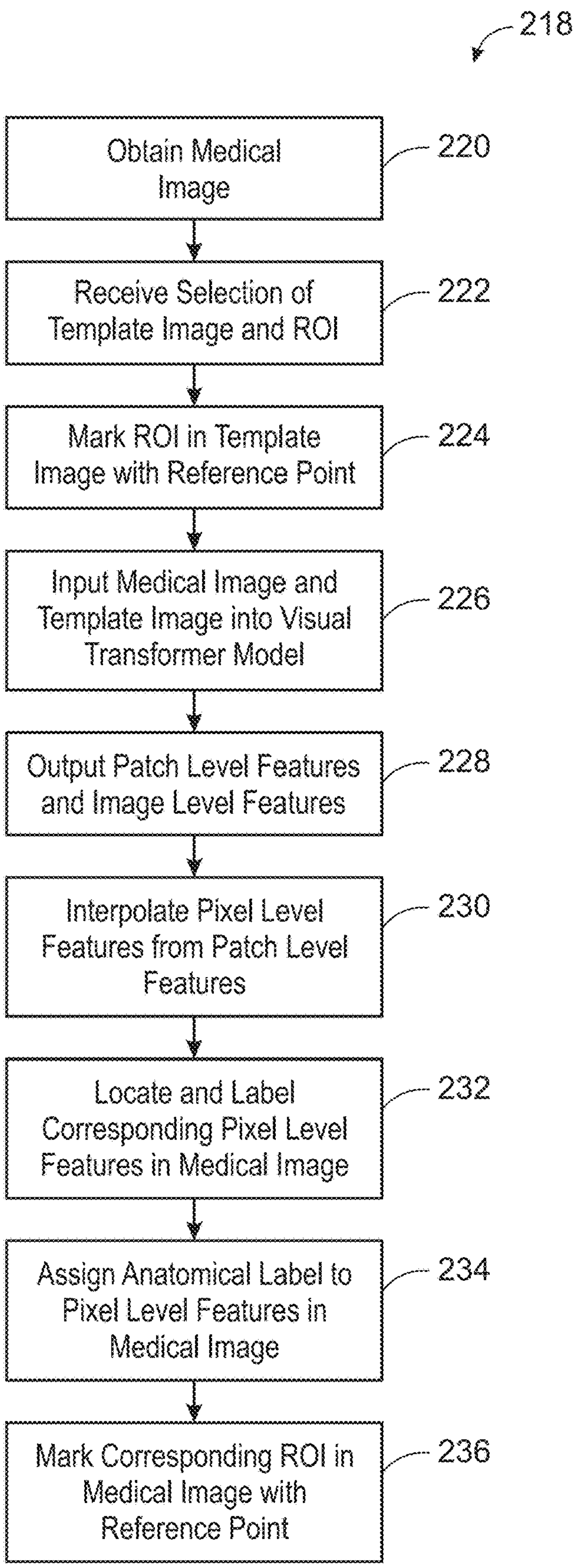
FIG. 4 illustrates a flow diagram of a method for performing one-shot anatomy localization (e.g., when the anatomy is distinct in an image (e.g., template image)), in accordance with aspects of the present disclosure.

FIG. 4 illustrates a flow diagram of a method 218 for performing one-shot anatomy localization (e.g., when the anatomy is distinct in an image (e.g., template image)). One or more steps of the method 218 may be performed by processing circuitry of the magnetic resonance imaging system 100 in FIG. 1, processing circuitry of an imaging system of another type (e.g., CT imaging system), or processing circuitry of a separate computing device. One or more of the steps of the method 218 may be performed simultaneously or in a different order from the order depicted in FIG. 4. Although discussed in terms of anatomy localization, the method 218 may be utilized for lesion detection or other type of application.

The method 218 includes obtaining a medical image (e.g., target image) of a subject (block 220). The method also includes receiving a selection of both a template image and a region of interest (ROI) within the template image (block 222). In certain embodiments, the selected region of interest is a mask. In certain embodiments, the selected region of interest is a patch. The template image may be generated as described in FIG. 8. In certain embodiments, the method 218 includes marking the region of interest in the template image with a first landmark or reference point (block 224). The template image includes one or more anatomical landmarks assigned a respective anatomical label. The method 218 further includes inputting both the medical image and the template image into a trained vision transformer model (block 226). The method 218 even further includes outputting from the trained vision transformer model both patch level features and image level features for both the medical image and the template image (block 228). The method 218 still further includes interpolating pixel level features from the patch level features for both the medical image and the template image (block 230). The method 218 yet further includes utilizing the pixel level features within the region of interest of the template image to locate and label corresponding pixel level features in the medical image (block 232). The corresponding pixel level features in the medical image may be labeled via segmentation masks.

The method 218 further includes assigning the corresponding pixel level features in the medical image an anatomical label corresponding to the region of interest in the template image (block 234). The method 218 even further includes marking, via the processor, a corresponding region of interest in the medical image with a second reference point that corresponds to the region of interest in the template image with the first reference point (block 236).

Figure 5:
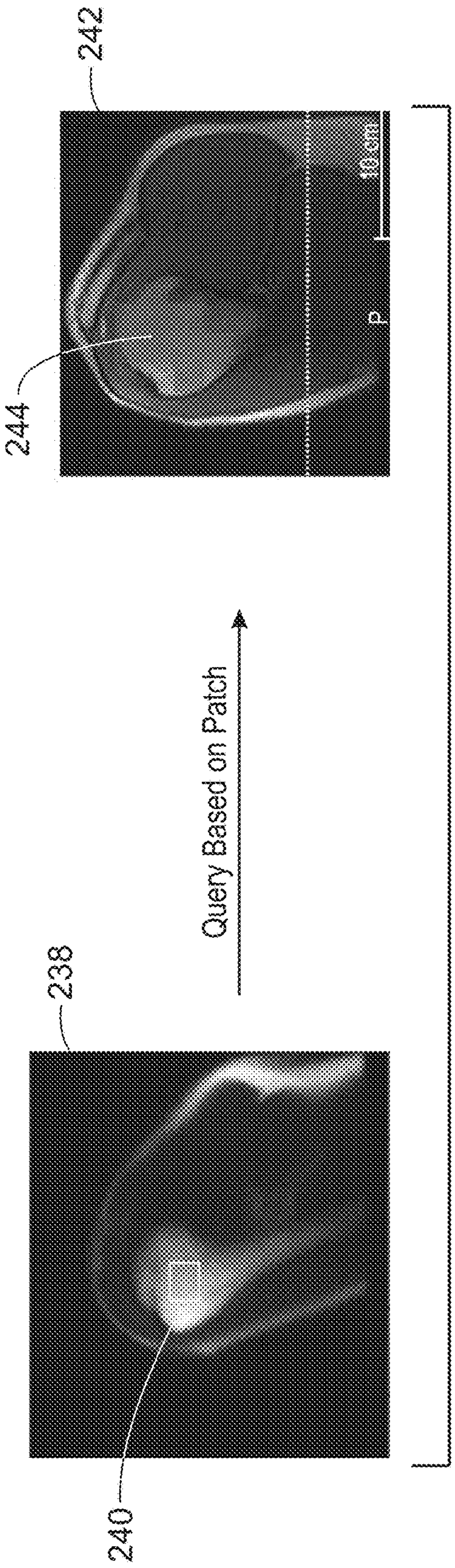
FIG. 5 illustrates a schematic diagram of querying a region of interest utilizing a patch (e.g., when the anatomy is distinct in an image (e.g., template image)), in accordance with aspects of the present disclosure.

FIG. 5 illustrates a schematic diagram of querying a region of interest utilizing a patch (e.g., when the anatomy is distinct in an image (e.g., template image)). A template image 238 (of a shoulder region) is selected. A region of interest 240 (in the form of a patch) is selected in the template image 238. The selected region of interest 240 is bone. The region of interest 240 (e.g., patch) is utilized to query a target medical image 242 (of a shoulder region) utilizing pixel level features derived from inputting both the template image 238 and the target medical image 242 into a trained vision transformer model. The pixel level features in the target medical image 242 corresponding to the pixel level features in the region of interest 240 of the template image 238 are located and labeled (e.g., via segmentation masks) as indicated by reference numeral 244. The template image 238 and the target medical image 242 MR images.

Figure 6:
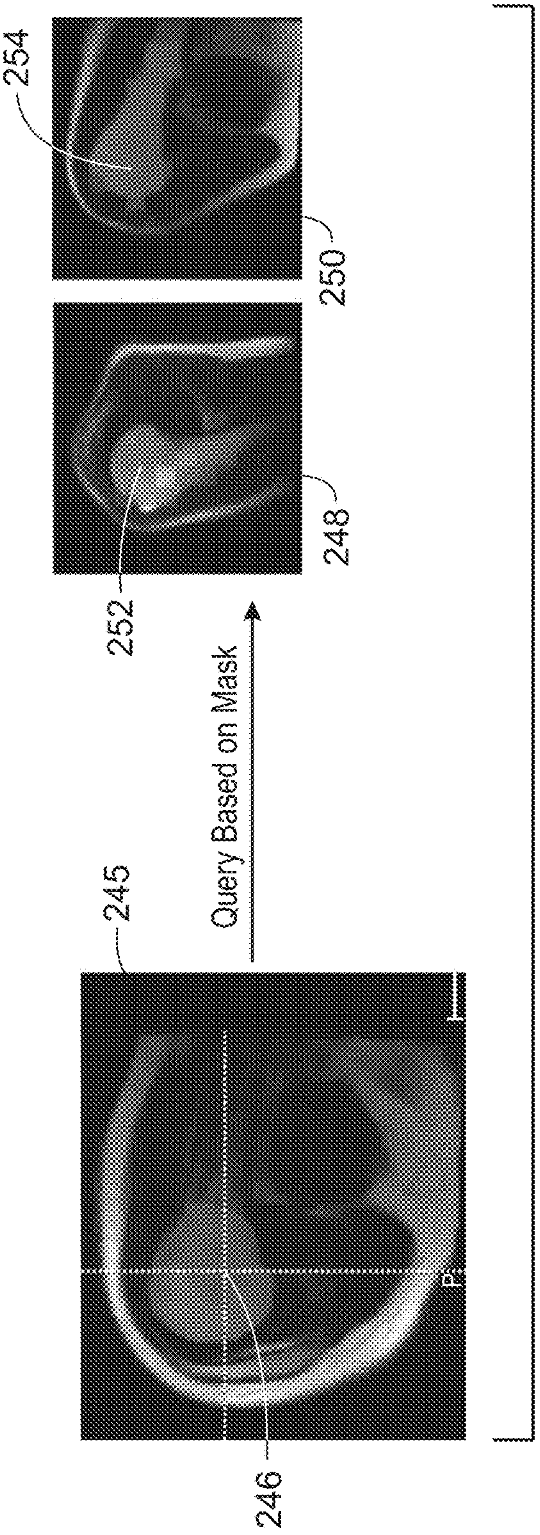
FIG. 6 illustrates a schematic diagram of querying a region of interest utilizing a mask (e.g., when the anatomy is distinct in an image (e.g., template image)), in accordance with aspects of the present disclosure.

FIG. 6 illustrates a schematic diagram of querying a region of interest utilizing a mask (e.g., when the anatomy is distinct in an image (e.g., template image)). A template image 245 (of a shoulder region) is selected. A region of interest 246 (in the form of a mask) is selected in the template image 245. The selected region of interest 246 is bone. The region of interest 246 (e.g., patch) is utilized to query target medical images 248, 250 (of a shoulder region) utilizing pixel level features derived from inputting both the template image 245 and the target medical images 248, 250 into a trained vision transformer model. The pixel level features in the target medical images 248, 250 corresponding to the pixel level features in the region of interest 246 of the template image 245 are located and labeled (e.g., via segmentation masks) as indicated by reference numerals 252, 254, respectively. The template image 245 and the target medical images 248, 250 are MR images.

Figure 7:
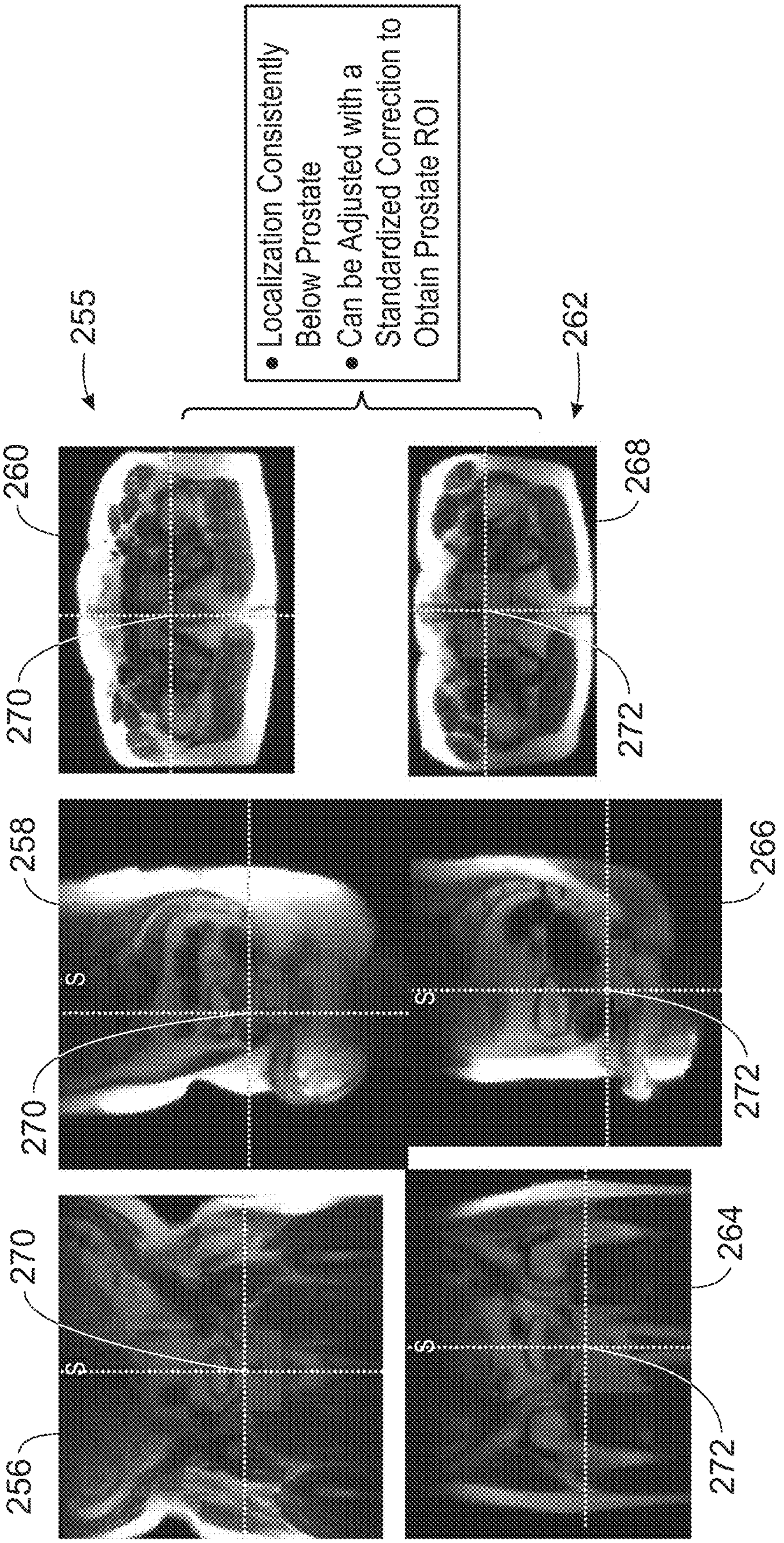
FIG. 7 illustrates a schematic diagram for performing region of image localization (e.g., when the anatomy is not distinct in an image (e.g., template images), in accordance with aspects of the present disclosure.

FIG. 7 illustrates a schematic diagram for performing region of image localization (e.g., when the anatomy is not distinct in an image (e.g., template images). A top row 255 of images 256, 258, 260 represent coronal, sagittal, and axial images including a prostate region selected for template images. A bottom row 262 of images 264, 266, 268 represent coronal, sagittal, and axial images including a prostate region that serve as target images. Both the template images and the target images are MR images. The selected region of interest in the template images (indicated by segmentation masks) are indicated by reference numeral 270. The corresponding region in the target images (indicated by segmentation masks) are indicated by reference numeral. In the case of anatomy which is not distance (such as the prostate), the localization may be off utilizing the region of interest for querying. For example, the localization in both the template images and the target images are consistently below the prostate. In these situations, the localization can be adjusted with a standardized correction to obtain the prostate region of interest.

Figure 8:
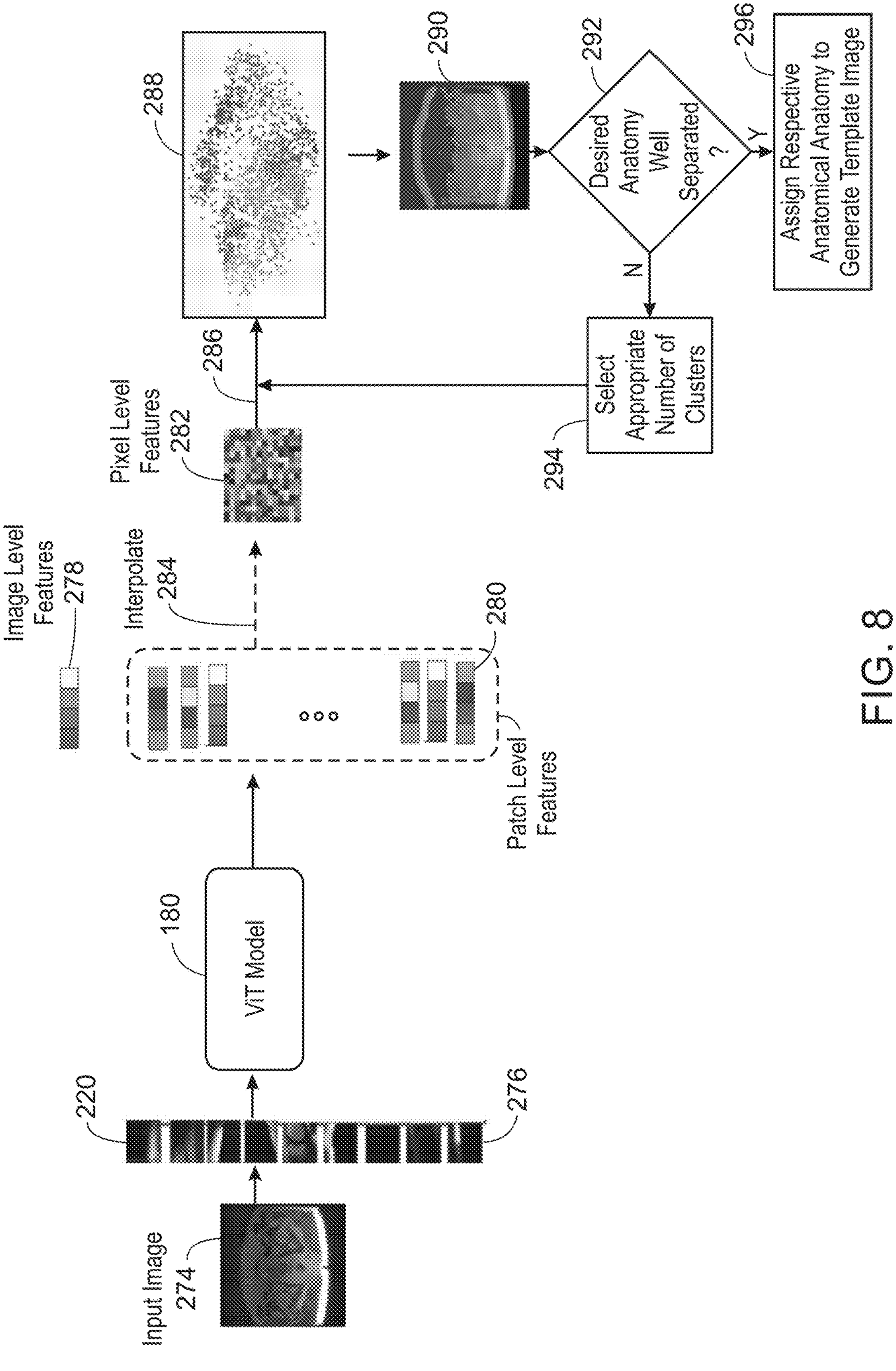
FIG. 8 illustrates a schematic diagram for generating a template image (e.g., utilizing a cluster-based approach), in accordance with aspects of the present disclosure.

FIG. 8 illustrates a schematic diagram for generating a template image (e.g., utilizing a cluster-based approach). As depicted in FIG. 8, a medical image 274 is separated into patches 276. The medical image 274 is an MR image of a prostate. The patches 276 are inputted into a trained vision transformer model 180. The vision transformer model 180 was trained utilizing self-supervised learning as described above in FIG. 3. The trained vision transformer model 180 outputs both image level features 278 and patch level features 280 for the medical image 274. Pixel level features 282 (e.g., respective vectors derived from each pixel) are obtained from the patch level features 280 of the medical image 274 via interpolation as indicated by arrow 284. The pixel level features 282 are clustered (e.g., pixel clustered) as indicated by arrow 286 so that pixel level features 282 belonging to similar regions cluster together as indicated in graph 288. Different cluster labels are then assigned to the pixels in the different regions as segmentation masks as indicated in the image 290. The segmentation masks for the different regions are color coded with different colors. At this point, the cluster labels are not associated with respective anatomical labels. A determination (e.g., visual analysis) of the image 290 is made as to whether the desired anatomy is well separated as indicated by reference numeral 292. If the desired anatomy is not well separated, an appropriate number of clusters is selected or determined (as indicated by reference numeral 294) and the pixel clustering is repeated. If the desired anatomy is well separated, the desired anatomy or one or more regions of interest may be assigned a respective anatomical label (as indicated by reference numeral 296) to generate a template image.

Figure 9:
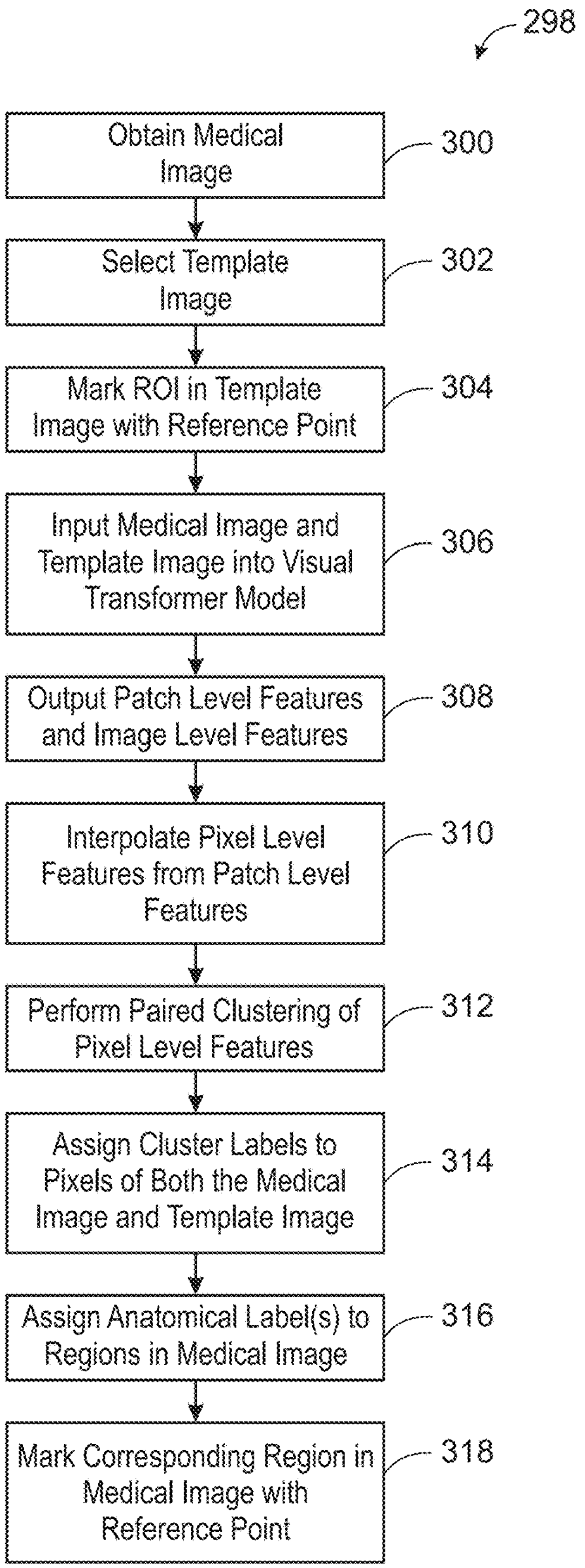
FIG. 9 illustrates a flow diagram of a method for performing one-shot anatomy localization (e.g., when the anatomy is indistinct in an image (e.g., template image)), in accordance with aspects of the present disclosure.

FIG. 9 illustrates a flow diagram of a method 298 for performing one-shot anatomy localization (e.g., when the anatomy is indistinct in an image (e.g., template image)). One or more steps of the method 298 may be performed by processing circuitry of the magnetic resonance imaging system 100 in FIG. 1, processing circuitry of an imaging system of another type (e.g., CT imaging system), or processing circuitry of a separate computing device. One or more of the steps of the method 298 may be performed simultaneously or in a different order from the order depicted in FIG. 9. Although discussed in terms of anatomy localization, the method 298 may be utilized for lesion detection or other type of application.

The method 298 includes obtaining a medical image (e.g., target image) of a subject (block 300). The method 298 also includes receiving a selection of a template image (block 302). The template image may be generated as described in FIG. 8. In certain embodiments, the method 298 includes marking a region of interest (ROI) or landmark region in the template image with a first landmark or reference point (block 304). The template image includes one or more anatomical landmarks assigned a respective anatomical label. In certain embodiments, the marking of the region of interest or landmark region may occur after paired clustering of pixel level features in the medical image and the template image. The method 298 further includes inputting both the medical image and the template image into a trained vision transformer model (block 306). The method 298 even further includes outputting from the trained vision transformer model both patch level features and image level features for both the medical image and the template image (block 308). The method 298 still further includes interpolating pixel level features from the patch level features for both the medical image and the template image (block 310). The method 298 yet further includes performing paired clustering to cluster the pixel level features for both the medical image and the template image into anatomically similar regions (block 312). The method 298 even further includes assigning cluster labels to pixels of both the medical image and the template image for corresponding anatomically similar regions (block 314). The corresponding pixels in both the medical image and the template image may be labeled via segmentation masks. The method 298 further includes assigning one or more of the corresponding anatomically similar regions in the medical image with the respective anatomical label associated with the corresponding anatomically similar regions in the template image (block 316). The method 298 still further includes marking a corresponding region in the medical image with a second reference point that corresponds to the region of interest in the template image marked with the first reference point (block 318).

Figure 10:
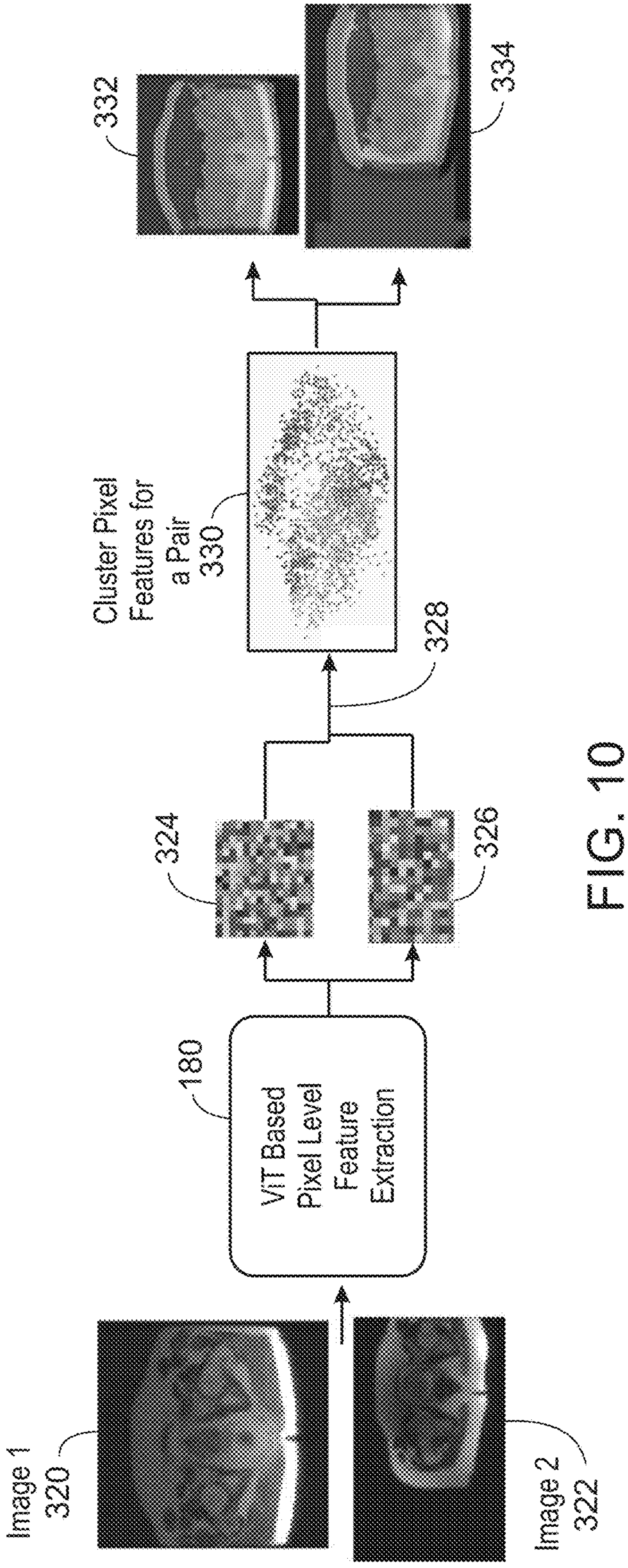
FIG. 10 illustrates a schematic diagram of segmenting a pair of images, in accordance with aspects of the present disclosure.

FIG. 10 illustrates a schematic diagram of segmenting a pair of images. As depicted in FIG. 8, a first image 320 (e.g., a template image) and a second image 322 (e.g., a medical image or target image) are inputted into a trained vision transformer model 180. The first image 320 and the second image 322 are MR images of a prostate. Although not shown, both the first image 320 and the second image 322 are each separated into patches that are inputted into the trained vision transformer model 180. The vision transformer model 180 was trained utilizing self-supervised learning as described above in FIG. 3. The trained vision transformer model 180 outputs both image level features and patch level features for both the first image 320 and the second image 322. Respective pixel level features 324, 326 (e.g., respective vectors derived from each pixel) are obtained from the patch level features of the both the first image 320 and the second image 322 via interpolation as indicated by arrow 284. The pixel level features 324, 326 are clustered (e.g., pixel clustered) together as indicated by arrow 328 so that pixel level features 282 belonging to similar regions cluster together as indicated in graph 330. Different cluster labels are then assigned to the pixels in the different regions as segmentation masks as indicated in the respective images 332, 334 for the first image 320 and the second image 322. Pairs of corresponding regions in both images 322, 334 emerge. The segmentation masks for the different regions are color coded with different colors. The fat regions, background, and pelvis areas are similar in both images 322, 324. Semantically similar regions are assigned similar cluster labels. As depicted in FIG. 10, features belonging to similar regions cluster across different images even with different field of views or different scales or different intensity changes.

Figure 11:
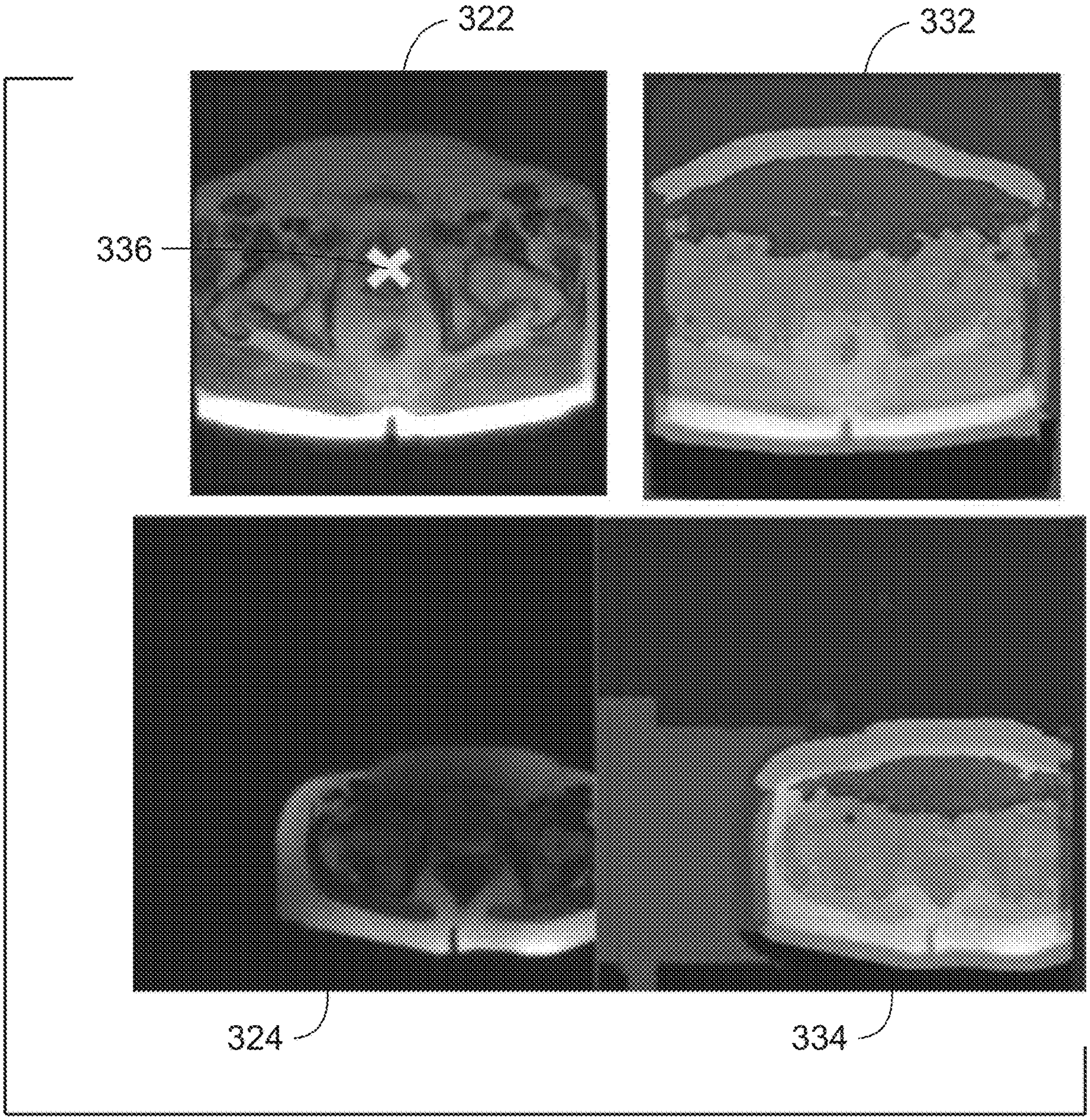
FIG. 11 illustrates associating anatomical labels to cluster label regions, in accordance with aspects of the present disclosure.

FIG. 11 illustrates associating anatomical labels to cluster label regions. FIG. 11 depicts the first image 322 (e.g., template image) and the corresponding cluster-labeled image 332 from FIG. 10. FIG. 11 also depicts the second image 324 (e.g., target image) and the corresponding cluster-labeled image 334 from FIG. 10. In certain embodiments, a region of interest or landmark region in the template image 322 is marked with a reference point 336. The region in the cluster-labeled image 334 of the target image 324 is anatomically labeled with the anatomical label associated with the reference point 336 in the template image 322. In certain embodiments, a region in the target image 324 corresponding to reference point 336 in the template image 322 is marked with a reference point corresponding to the reference point 336.

Figure 12:
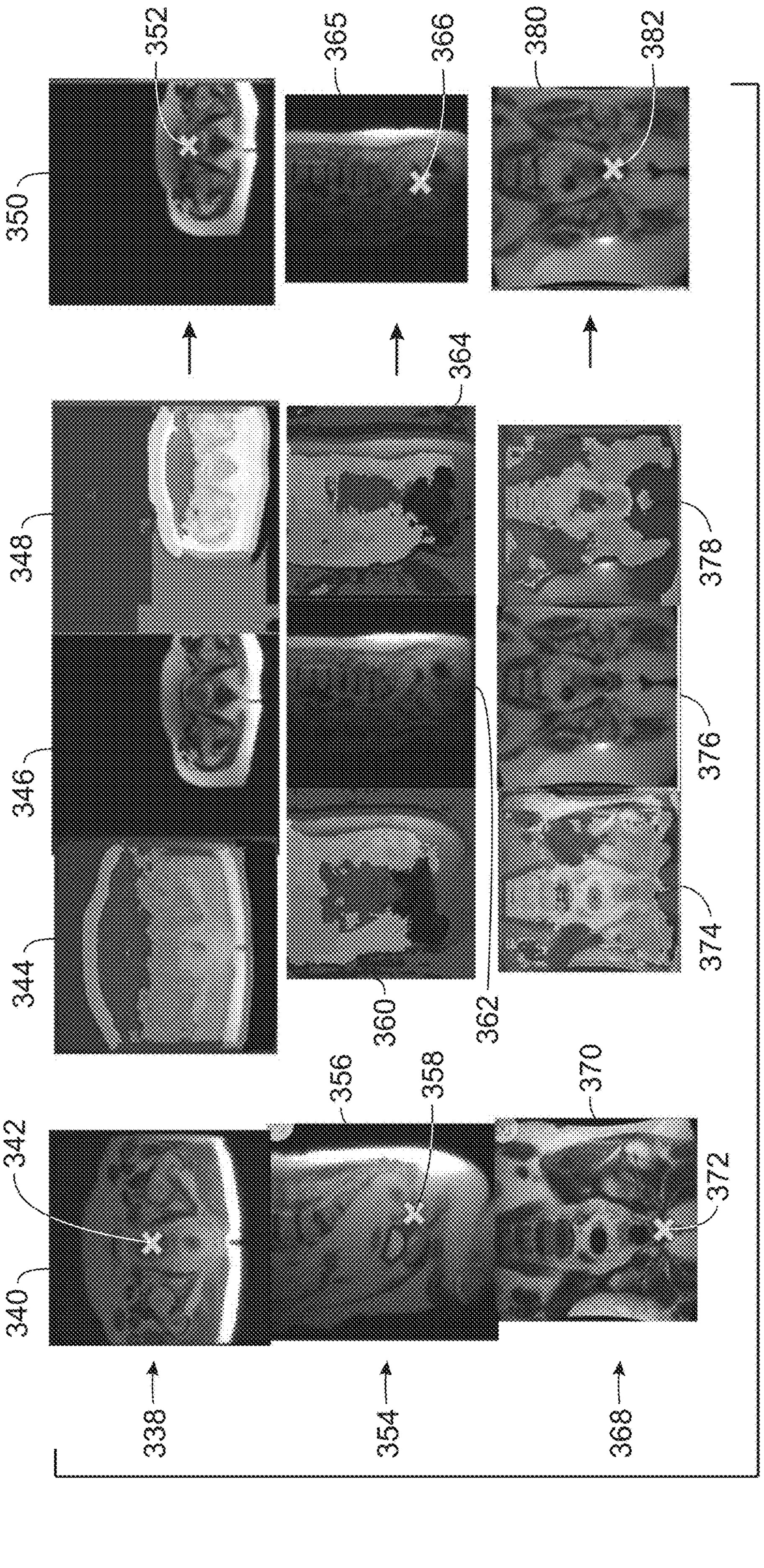
FIG. 12 illustrates localization along orthogonal planes, in accordance with aspects of the present disclosure.

FIG. 12 illustrates localization along orthogonal planes (e.g., coronal, sagittal, and axial planes). The images depicted in FIG. 12 are MR images of a prostate. A top row 338 includes image 340, which is a template image marked with a reference point 342. Image 344 is a cluster-labeled image of the image 340. Image 346 is a target image. Image 348 is a cluster-labeled image of the image 346. Image 350 is the target image with a reference point 352 transferred to it that corresponds to the reference point 342 in a region of interest in the template image (i.e., image 340). The reference point 352 is located in a location equivalent to the centroid of the label masks for the corresponding region of interest in the image 348. Images 340, 344, 346, 348, and 350 are along an axial plane. The images 340, 344, 346, and 348 correspond to the images 320, 322, 332, and 334 in FIG. 11.

A middle row 354 includes image 356, which is a template image marked with a reference point 358. Image 360 is a cluster-labeled image of the image 356. Image 362 is a target image. Image 364 is a cluster-labeled image of the image 362. Image 365 is the target image with a reference point 366 transferred to it that corresponds to the reference point 358 in a region of interest in the template image (i.e., image 356). The reference point 366 is located in a location equivalent to the centroid of the label masks for the corresponding region of interest in the image 364. Images 356, 360, 362, and 364, and 365 are along a sagittal plane.

A bottom row 368 includes image 370, which is a template image marked with a reference point 372 Image 374 is a cluster-labeled image of the image 370. Image 376 is a target image. Image 378 is a cluster-labeled image of the image 376. Image 380 is the target image with a reference point 382 transferred to it that corresponds to the reference point 372 in a region of interest in the template image (i.e., image 370). The reference point 382 is located in a location equivalent to the centroid of the label masks for the corresponding region of interest in the image 378. Images 370, 374, 376, 378, and 380 are along a coronal plane. FIG. 12 depicts performing localization in 3D by generating localized landmarks in the orthogonal set of images (which describe a 3D volume). The planes can either be straight or oblique.

Figure 13:
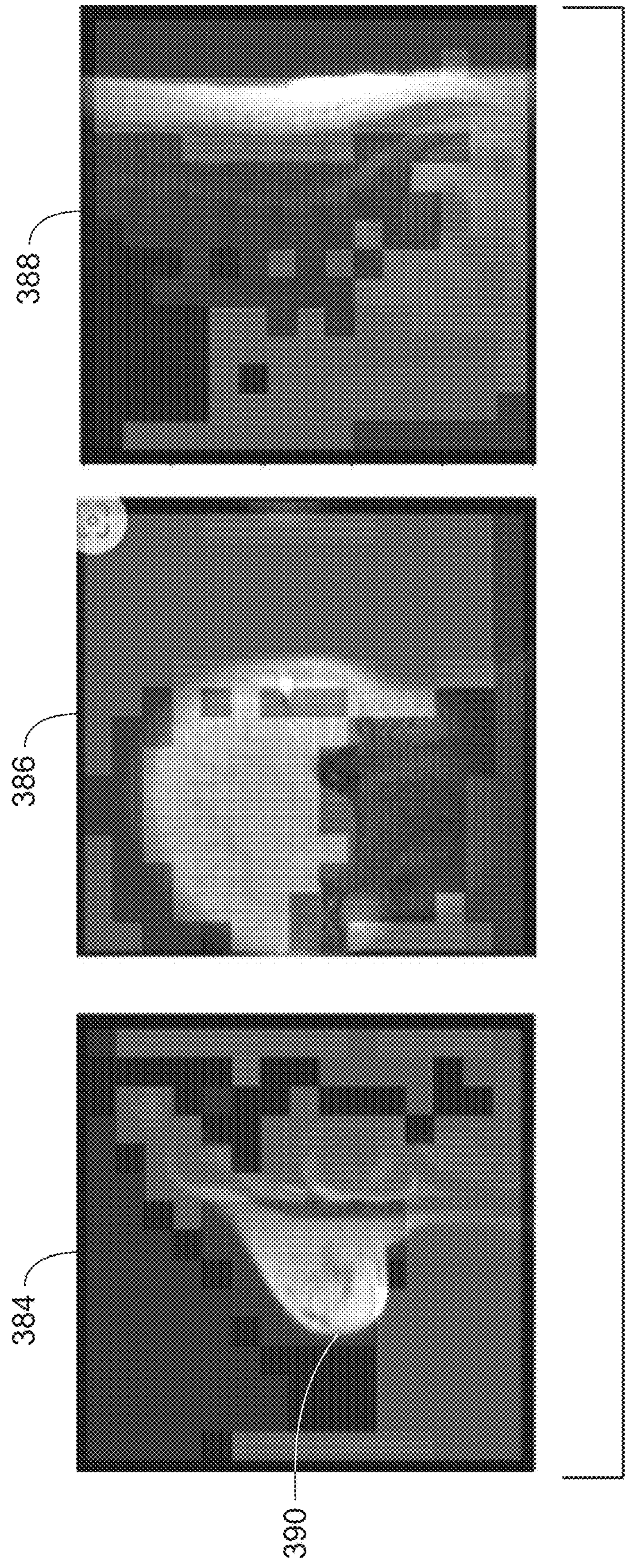
FIG. 13 are examples of images of clusters of anatomically contiguous regions, in accordance with aspects of the present disclosure.

FIG. 13 are examples of images 384, 386, 388 of clusters of anatomically contiguous regions. Image 384 is of a breast region. Image 386 is of a brain region. Image 388 is of a spine/fat region. The clusters of anatomically contiguous regions were generated automatically utilizing the transformer vision model trained with unsupervised learning followed by clustering and cluster labeling. As depicted in the images 384, 386, 388, the regions have self-localized. Image 384 of the breast region has been automatically anatomically labeled as indicated by reference numeral 390 utilizing a template image with a breast label.

Technical effects of the disclosed subject matter includes eliminating the need for manual annotation. Technical effects of the disclosed subject matter also include providing a fast, automatic localization of an anatomical landmark (e.g., for a subsequent imaging scan). Technical effects of the disclosed subject matter further include utilizing transformers to identify corresponding landmark points between pairs of images without supervision, image registration, or any standardized shape or size. Technical effects of the disclosed subject matter even further include saving time in planning a scan by avoiding repeated localizer scans.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for performing one-shot anatomy localization, comprising:
- obtaining, at a processor, a medical image of a subject;
- receiving, at the processor, a selection of a template image, wherein the template image includes one or more anatomical landmarks assigned a respective anatomical label, and a first reference point is marked on the template image;
- inputting, via the processor, both the medical image and the template image into a trained vision transformer model;
- outputting, via the processor, from the trained vision transformer model both patch level features and image level features for both the medical image and the template image;
- clustering, via the processor, pixel level features from both the medical image and the template image together via paired clustering into anatomically similar regions, wherein the pixel level features are derived from the patch level features and the image level features; and
- assigning, via the processor, cluster labels to pixels of both the medical image and the template image for corresponding anatomically similar regions.

2. The computer-implemented method of claim 1, wherein the trained vision transformer model was trained on a plurality of unlabeled medical images utilizing self-supervised learning.

3. The computer-implemented method of claim 1, further comprising:
- obtaining, at the processor, an orthogonal set of medical images of the subject, wherein the orthogonal set of medical images describe a three-dimensional volume of a region of interest of the subject;
- receiving, at the processor, a selection of a set of template images, wherein each template image of the set of template images includes one or more anatomical landmarks assigned respective anatomical labels, and a respective reference point is marked on each template image of the set of template images, wherein each template image of the set of template images corresponds to a respective medical image of the set of medical images;
- inputting, via the processor, both the orthogonal set of medical images and the set of template images into the trained vision transformer model;
- outputting, via the processor, from the trained vision transformer model both respective patch level features and respective image level features for both the orthogonal set of medical images and the set of template images;
- interpolating, via the processor, respective pixel level features from the respective patch level features for both the orthogonal set of medical images and the set of template images;
- clustering, via the processor, the respective pixel level features for both the orthogonal set of medical images and the set of template images into anatomically similar regions; and
- assigning, via the processor, cluster labels to the pixels of both the orthogonal set of medical images and the set of template images for corresponding anatomically similar regions.

4. The computer-implemented method of claim 1, further comprising assigning, via the processor, one or more of the corresponding anatomically similar regions in the medical image with the respective anatomical label associated with the corresponding anatomically similar regions in the template image.

5. The computer-implemented method of claim 1, further comprising marking, via the processor, a region of interest in the template image with a first reference point.

6. The computer-implemented method of claim 5, further comprising marking, via the processor, a corresponding region in the medical image with a second reference point that corresponds to the region of interest in the template image marked with the first reference point.

7. The computer-implemented method of claim 1, wherein assigning cluster labels comprises applying segmentation masks to the both the medical image and the template image.

8. A system for performing one-shot anatomy localization, comprising:
- a memory encoding processor-executable routines; and
- a processor configured to access the memory and to execute the processor-executable routines, wherein the processor-executable routines, when executed by the processor, cause the processor to:
  - obtain a medical image of a subject;
  - receive a selection of a template image, wherein the template image includes one or more anatomical landmarks assigned a respective anatomical label, and a first reference point is marked on the template image;

input both the medical image and the template image into a trained vision transformer model;

output from the trained vision transformer model both patch level features and image level features for both the medical image and the template image;

cluster pixel level features from both the medical image and the template image together via paired clustering into anatomically similar regions, wherein the pixel level features are derived from the patch level features and the image level features; and assign cluster labels to pixels of both the medical image and the template image for corresponding anatomically similar regions.

9. The system of claim 8, wherein the trained vision transformer model was trained on a plurality of unlabeled medical images utilizing self-supervised learning.

10. The system of claim 8, wherein the processor-executable routines, when executed by the processor further cause the processor to:

obtain an orthogonal set of medical images of the subject, wherein the orthogonal set of medical images describe a three-dimensional volume of a region of interest of the subject;

receive a selection of a set of template images, wherein each template image of the set of template images includes one or more anatomical landmarks assigned respective anatomical labels, and a respective reference point is marked on each template image of the set of template images, wherein each template image of the set of template images corresponds to a respective medical image of the set of medical images;

input both the orthogonal set of medical images and the set of template images into the trained vision transformer model;

output from the trained vision transformer model both respective patch level features and respective image level features for both the orthogonal set of medical images and the set of template images;

interpolate respective pixel level features from the respective patch level features for both the orthogonal set of medical images and the set of template images;

cluster the respective pixel level features for both the orthogonal set of medical images and the set of template images into anatomically similar regions; and assign cluster labels to the pixels of both the orthogonal set of medical images and the set of template images for corresponding anatomically similar regions.

11. The system of claim 8, wherein the processor-executable routines, when executed by the processor further cause the processor to assign one or more of the corresponding anatomically similar regions in the medical image with the respective anatomical label associated with the corresponding anatomically similar regions in the template image.

12. The system of claim 8, wherein the processor-executable routines, when executed by the processor further cause the processor to mark a region of interest in the template image with a first reference point.

13. The system of claim 12, wherein the processor-executable routines, when executed by the processor further cause the processor to mark a corresponding region in the medical image with a second reference point that corresponds to the region of interest in the template image marked with the first reference point.

14. The system of claim 8, wherein assigning cluster labels comprises applying segmentation masks to the both the medical image and the template image.

* * * * *